US012745173B2

(12) United States Patent
Zhou et al.

(10) Patent No.: US 12,745,173 B2
(45) Date of Patent: Sep. 22, 2026

(54) COMMUNICATION METHOD AND APPARATUS, AND STORAGE MEDIUM FOR POWER SAVING VIA PAGING INDICATION

(71) Applicant: Spreadtrum Communications (Shanghai) Co., Ltd., Shanghai (CN)

(72) Inventors: Huayu Zhou, Shanghai (CN); Zhenzhu Lei, Shanghai (CN); Sicong Zhao, Shanghai (CN); Zhengang Pan, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 366 days.

(21) Appl. No.: 18/256,047

(22) PCT Filed: Nov. 17, 2021

(86) PCT No.: PCT/CN2021/131327

§ 371 (c)(1),
(2) Date: Jun. 5, 2023

(87) PCT Pub. No.: WO2022/116838

PCT Pub. Date: Jun. 9, 2022

(65) Prior Publication Data

US 2024/0080766 A1 Mar. 7, 2024

(30) Foreign Application Priority Data

Dec. 4, 2020 (CN) ......................... 202011407189.8

(51) Int. Cl.
*H04W 52/02* (2009.01)
*H04W 68/02* (2009.01)

(52) U.S. Cl.
CPC ... *H04W 52/0229* (2013.01); *H04W 52/0212* (2013.01); *H04W 68/02* (2013.01)

(58) Field of Classification Search
CPC ......... H04W 52/0229; H04W 52/0212; H04W 68/02; H04W 68/005
See application file for complete search history.

(56) References Cited

U.S. PATENT DOCUMENTS

2020/0221508 A1 7/2020 Huang et al.
2022/0132464 A1* 4/2022 Agiwal ................ H04W 68/02
(Continued)

FOREIGN PATENT DOCUMENTS

CN 109151849 A1 1/2019
CN 109286966 A 1/2019
(Continued)

OTHER PUBLICATIONS

3GPP TSG RAN WG1 #103e R1-2008054; eMeeting, Oct. 26-Nov. 13, 2020; Agenda Item: 8.7.1.2; Source: LG Electronics; Title: Discussion on TRS/CSI-RS occasion(s) for idle/inactive UEs; Document for: Discussion and Decision (Year: 2020).*
(Continued)

*Primary Examiner* — Robert C Scheibel
(74) *Attorney, Agent, or Firm* — Quarles & Brady LLP

(57) ABSTRACT

A communication method and apparatus, a device, a storage medium and a program product, where the communication method includes: monitoring a paging indication physical downlink control channel (PDCCH), and acquiring indication information; determining, based on the indication information, a state of at least one reference signal, or determining, based on the indication information, whether to monitor a paging PDCCH, where the state is an available state or an unavailable state.

15 Claims, 5 Drawing Sheets

Monitor a paging indication physical downlink control channel (PDCCH), and acquire indication information | S201

Determine, based on the indication information, a state of at least one reference signal, or determine, based on the indication information, whether to monitor a paging PDCCH, where the state is an available state or an unavailable state | S202

(56) References Cited

U.S. PATENT DOCUMENTS

| | | | | |
|---|---|---|---|---|
| 2023/0284183 | A1* | 9/2023 | Li | H04W 68/025 455/458 |
| 2023/0388968 | A1* | 11/2023 | Yang | H04W 68/025 |
| 2023/0397109 | A1* | 12/2023 | Wang | H04W 52/0235 |

FOREIGN PATENT DOCUMENTS

| | | | |
|---|---|---|---|
| CN | 110463285 | A | 11/2019 |
| CN | 110730504 | A | 1/2020 |
| CN | 111200870 | A | 5/2020 |
| CN | 111385826 | A | 7/2020 |
| CN | 111585724 | A | 8/2020 |
| CN | 111867017 | A | 10/2020 |
| EP | 3735049 | A1 | 4/2020 |
| WO | 2020032746 | A1 | 2/2020 |
| WO | 2020201885 | A1 | 10/2020 |

OTHER PUBLICATIONS

First Office Action, Chinese Application No. 202011402942.4, Mar. 28, 2024.

First Office Action, Chinese Application No. 202011407189.8, Mar. 27, 2024.

Extended European Search Report, European Application No. 21899872, May 6, 2024.

International Search Report and Written Opinion, International Application No. PCT/CN2021/131326, Feb. 8, 2022.

Vivo. “3GPP TSG RAN WGI #102-e RI-2005389” Discussion on TRS/CSI-RS occasion(s) for idle/inactive UEs, Aug. 28, 2020, pp. 1-7.

Moderator Samsung. “3GPP TSG RANWGI #102-e RI-2007475” Summary for TRS/CSI-RS occasion(s) for idle/inactive UEs, Aug. 28, 2020.

3GPP TSG-RAN WG1 #103-e R1-2009267; e-Meeting, Oct. 26-Nov. 13, 2020; Agenda item: 8.7.1.2; Source: Qualcomm Incorporated; Title: TRS/CSI-RS for idle/inactive UE power saving; Document for: Discussion/Decision.

WIPO ISR—PCT/CN2021/131327 filed on Nov. 17, 2021; Date of the actual completion of the international search: Dec. 9, 2021; Date of mailing of the international search report: Jan. 21, 2022.

CNIPA, Notification to Grant Patent Right for Invention of Application No. 202011407189.8, dated Jan. 9, 2026, 6 pages.

Intellectual Property India, Hearing Notice in Reference of Application No. 202317044877, May 6, 2026, 2 pages.

3GPP, 3rd Generation Partnership Project; 5G; NR; Radio Resource Control (RRC); Protocol specification (3GPP TS 38.331 version 15.2.1 Release 15), dated Jun. 2018, 299 pages.

3GPP, 3rd Generation Partnership Project; Technical Specification Group Radio Access Network; NR; Study on User Equipment (UE) power saving in NR (Release 16), dated Jun. 2019, 74 pages.

Intellectual Propert India, Hearing Notice in Reference of Application No. 202317044877, May 25, 2026, 2 pages.

Intellectual Property India, Hearing Notice in Reference of Application No. 202317044877, Jun. 5, 2026, 2 pages.

* cited by examiner

COMMUNICATION METHOD AND APPARATUS, AND STORAGE MEDIUM FOR POWER SAVING VIA PAGING INDICATION

CROSS-REFERENCE TO RELATED APPLICATIONS

This application is a national stage of International Application No. PCT/CN2021/131327, filed on Nov. 17, 2021, which claims the priority to Chinese patent application No. 202011407189.8 titled "Communication method and apparatus, device, storage medium and program product" and filed with the China National Intellectual Property Administration on Dec. 4, 2020. The two applications are incorporated into this application by reference in their entireties.

TECHNICAL FIELD

The present disclosure relates to the field of communication technologies, and in particular to a communication method and apparatus, a device, a storage medium and a program product.

BACKGROUND

When a terminal device is in an idle state, the terminal device needs to monitor a paging physical downlink control channel (PDCCH) for carrying a paging message, to determine whether there is a paging message sent to itself.

In related technologies, when a terminal device is in an idle state, in order to achieve monitoring of the paging PDCCH, a network device needs to send an additional reference signal to the terminal device, to reduce a time for the terminal device to wake up in advance before a paging occasion. The terminal device performs automatic gain control (AGC) adjustment/time-frequency synchronization (channel tracking) based on a synchronization signal block and an additional reference signal, to receive paging and save energy. In the above technology, the additional reference signal is usually a signal that does not exist in a communication system (including a network device and a UE), resulting in a large overhead and reduced capacity of the communication system. At present, in order to reduce overhead and increase capacity of the communication system, the network device usually sends a reference signal which is sent to a terminal device in a connected state, to a terminal device in an idle state.

However, the network device usually sends the reference signal, which is sent to the terminal device in a connected state, to the terminal device in an idle state, so that the terminal device in the idle state cannot determine whether the reference signal is available after receiving the reference signal. Moreover, because it takes a long time to wake up in advance, power consumption of the terminal device to monitor the paging occasion is high.

Especially, when the terminal device needs to wake up frequently to receive paging, the above-mentioned current consumption (i.e, power consumption) problem will be more serious. Therefore, how to reduce the frequency of waking up by the terminal device to receive paging (including waking up to monitor the paging physical downlink control channel (PDCCH)) is also an urgent problem to be solved.

SUMMARY

The present disclosure provides a communication method and apparatus, a device, a storage medium and a program product.

In a first aspect, an embodiment of the present disclosure provides a communication method, including:

monitoring a paging indication physical downlink control channel (PDCCH), and acquiring indication information; and determining, based on the indication information, a state of at least one reference signal, or determining, based on the indication information, whether to monitor a paging PDCCH, where the state is an available state or an unavailable state.

In a second aspect, an embodiment of the present disclosure provides a communication apparatus, applied to a terminal device and including: an acquiring module and a determining module, where, the acquiring module is configured to monitor a paging indication physical downlink control channel (PDCCH), and acquire indication information; and the determining module is configured to determine, based on the indication information, a state of at least one reference signal, or determine, based on the indication information, whether to monitor a paging PDCCH, where the state is an available state or an unavailable state.

In a third aspect, an embodiment of the present disclosure provides a computer-readable storage medium which has a computer-executable instruction stored thereon, and when a processor executes the computer-executable instruction, the method according to the first aspect is implemented.

Embodiments of the present disclosure provide a communication method and apparatus, a device, a storage medium and a program product, where the communication method includes: monitoring a paging indication physical downlink control channel (PDCCH), and acquiring indication information: determining, based on the indication information, a state of at least one reference signal, or determining, based on the indication information, whether to monitor a paging PDCCH, where the state is an available state or an unavailable state.

BRIEF DESCRIPTION OF DRAWINGS

In order to describe the embodiments of the present disclosure or the technical solutions in the prior art more clearly, in the following, drawings that need to be used in the description of the embodiments or prior art will be introduced briefly. Apparently, the accompanying drawings in the following description are some embodiments of the present disclosure, and for those of skilled in the art, other drawings can be obtained based on these drawings without paying creative efforts.

DESCRIPTION OF EMBODIMENTS

Figure 1:
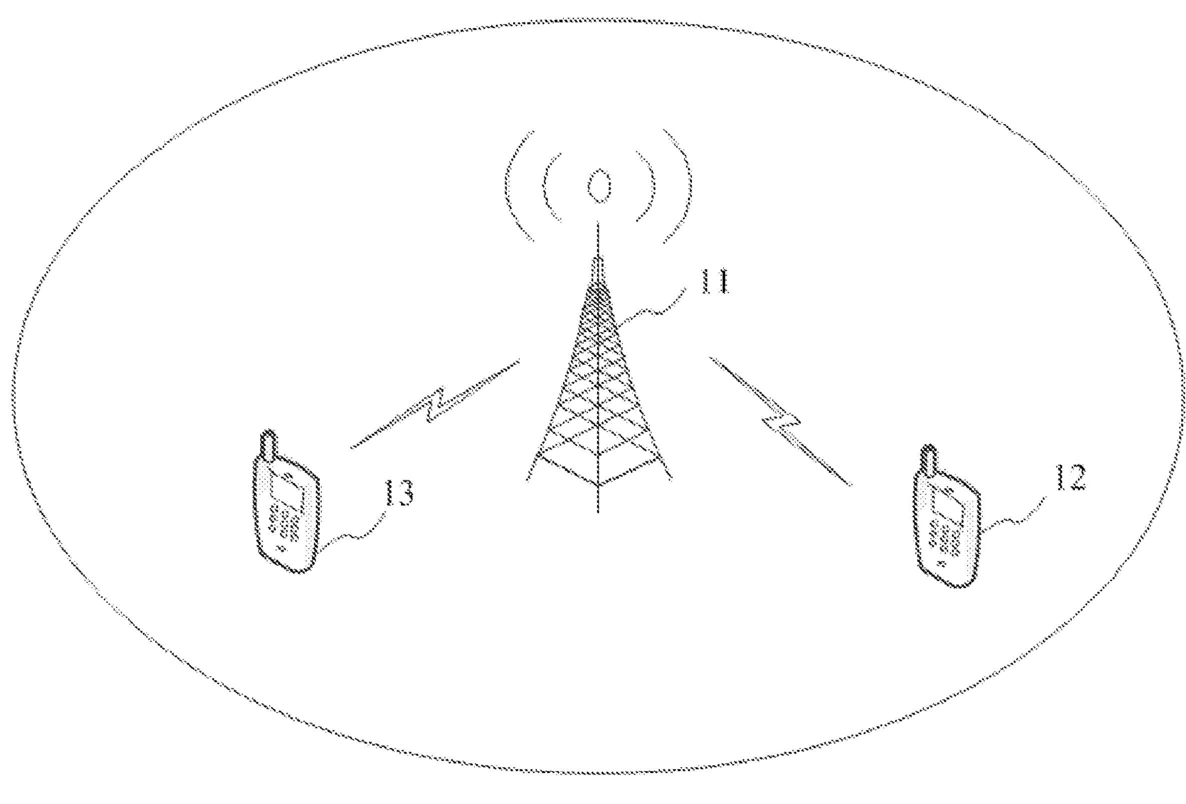
FIG. 1 is a diagram of an application scenario of a communication method according to an embodiment of the present disclosure.

In order to make the purpose, technical solutions and advantages of embodiments of the present disclosure clearer, the technical solutions in the embodiments of the present disclosure will be described as follows clearly and completely in conjunction with accompanying drawings in the embodiments of the present disclosure. Apparently, the described embodiments are a part rather than all of the embodiments of the present disclosure. Based on the embodiments in the present disclosure, all other embodiments obtained by those of ordinary skill in the art without paying creative work shall fall within the protection scope of the present disclosure.

The terms "first", "second", "third", and "fourth" in the specification and claims of the present disclosure and the accompanying drawings above, if present, are used to distinguish similar objects and need not be used to describe a particular order or sequence. It should be understood that the data so used is interchangeable where appropriate, so that embodiments of the present disclosure described herein, for example, can be implemented in an order other than those illustrated or described herein. In addition, the terms "include" and "have", and any variations thereof, are intended to cover non-exclusive inclusion. For example, a process, a method, a communication system, a product, or an apparatus including a series of steps or units, need not be limited to those steps or units that are clearly listed, but may include other steps or units that are not clearly listed or that are inherent to the process, method, product, or device.

In the prior art, when a terminal device is in an idle state, for example, the idle state is idle mode or radio resource control (RRC) idle, the terminal device needs to monitor a paging PDCCH. Generally speaking, the terminal device needs to determine a paging PDCCH monitoring occasion through a paging frame (PF), a paging occasion (PO), and a paging search space set, and then monitors the paging PDCCH at the paging PDCCH monitoring occasion. In a 5G new radio (NR), the terminal device performs AGC adjustment/time-frequency tracking (channel tracking)/measurement based on a synchronization signal block (SSB), and then can monitor the paging PDCCH at the paging occasion. In a practical application, a synchronization signal-burst (SS-burst) (where each SS-burst includes a plurality of SSBs) does not exist in every subframe or every time slot, but is sent in a certain time period (e.g. 5 ms, 10 ms, 20 ms, etc.). Therefore, generally speaking, the terminal device needs to wake up at least before last two SS-bursts before the PO, and use these two SS-bursts to perform AGC adjustment/time-frequency synchronization, or perform AGC adjustment/time-frequency synchronization/measurement. When the terminal device has experienced long-term sleep, for example, an interval between two POs that the terminal device needs to monitor is large due to PO configuration, the UE may need to wake up before last three SS-bursts before the PO, and use these three SS-bursts to perform AGC adjustment/time-frequency synchronization, or AGC adjustment/time-frequency synchronization/measurement, which will cause the terminal device to wake up prematurely in advance, and further cause the terminal device to consume more power.

Furthermore, in the prior art, the network device can configure an additional reference signal and send it to the terminal device, so that the terminal device can use fewer SS-bursts (such as one) and additional reference signals to perform AGC adjustment/time-frequency synchronization, or AGC adjustment/time-frequency synchronization/measurement, to prevent the terminal device from waking up prematurely in advance, thereby achieving the purpose of saving power of the terminal device.

In the above prior art, although an additional reference signal shortens the wake-up time of the terminal device and achieves the purpose of saving power of the terminal device, the additional reference signal is usually a reference signal that does not exist in the communication system, which needs to increase the overhead of the communication system and reduce the capacity of the communication system. For this point, a possible enhancement method is to enable the terminal device in the idle state to use the reference signal (TRS/CSI-RS), which is used by the terminal device in the connected state. That is, the network device shares the reference signal, which is used by the terminal device in the connected state, to the terminal device in the idle state, to reduce the overhead of the communication system. However, the reference signal of the terminal device in the connected state may become unavailable (or non-existent or invalid), as a terminal device in the connected state leaves the connected state (RRC release). At this time, it is necessary to notify the terminal device in the idle state that the reference signal is unavailable.

Therefore, how to notify the terminal device in the idle state whether the reference signal is available is an urgent problem to be solved. In order to solve the above problems, an embodiment of the present disclosure provides a communication method, which enables the terminal device to determine a state of the reference signal (is an available state or an unavailable state) through indication information corresponding to a paging monitoring occasion (PMO) or a paging occasion (PO). That is, the terminal device is enabled to determine whether the reference signal is available, thereby solving the technical problem that the terminal device in the idle state cannot determine whether the reference signal is available.

An application scenario of the communication method according to the embodiment of the present disclosure will be described below with reference to FIG. 1.

FIG. 1 is a diagram of an application scenario of a communication method according to an embodiment of the present disclosure. As shown in FIG. 1, the communication system includes: a network device 11 and multiple terminal devices. For example, the multiple terminal devices include a terminal device 12 and a terminal device 13. The terminal device 12 is in a connected state, and the terminal device 13 is in an idle state. The network device 11 may send a reference signal, which is sent to the terminal device 12, to the terminal device 13. The network device 11 sends indication information to the terminal device 13, to enable the terminal device 13 determine a state of the reference signal after receiving the indication information.

In the present disclosure, a network device: is a device with a wireless transceiver function. The network device includes but is not limited to: an evolutional base station (Evolutional Node B, eNB or eNodeB) in long term evolution (LTE), a base station (gNodeB or gNB) or TRP in new radio (NR), a base station in a subsequent evolved communication system, an access node in a wireless fidelity (WiFi) communication system, a wireless relay node, a wireless backhaul node, etc. The base station may be: a macro base station, a micro base station, a pico base station, a small station, a relay station, or a balloon station, etc. Multiple base stations may support the aforementioned networks of the same technology, or may support the aforementioned networks of different technologies. The base station may include one or more co-sited or non-co-sited transmission receiving point (TRP).

In the present disclosure, a terminal device: is a device with a wireless transceiver function. The terminal device can be deployed on land, including indoors or outdoors, handheld, wearable or vehicle-mounted, the terminal device can also be deployed on water (such as on a ship), and the terminal can also be deployed in the air (such as on an aircraft, a balloon or a satellite). The terminal device may be a mobile phone, a tablet computer (Pad), a computer with a wireless transceiver function, a virtual reality (VR) terminal device, an augmented reality (AR) terminal device, an wireless terminal in industrial control, a vehicle-mounted terminal device, a wireless terminal in self driving, a wireless terminal device in remote medical, a wireless terminal device in smart grid, a wireless terminal device in transportation safety, a wireless terminal device in smart city, a wireless terminal device in smart home, a wearable terminal device, etc. The terminal device involved in the embodiments of the present disclosure may also be referred to as a terminal, a user equipment (UE), a access terminal device, a vehicle-mounted terminal, an industrial control terminal, a UE unit, a UE station, a mobile station, a mobile termination, a remote station, a remote terminal device, a mobile device, a UE terminal device, a wireless communication device, a UE agent or a UE apparatus, etc. The terminal device can be fixed or mobile.

The technical solution of the present disclosure will be described in detail below with specific embodiments. The following specific embodiments can be combined with each other, and the same or similar concepts or processes may not be repeated in some embodiments.

Figure 2:
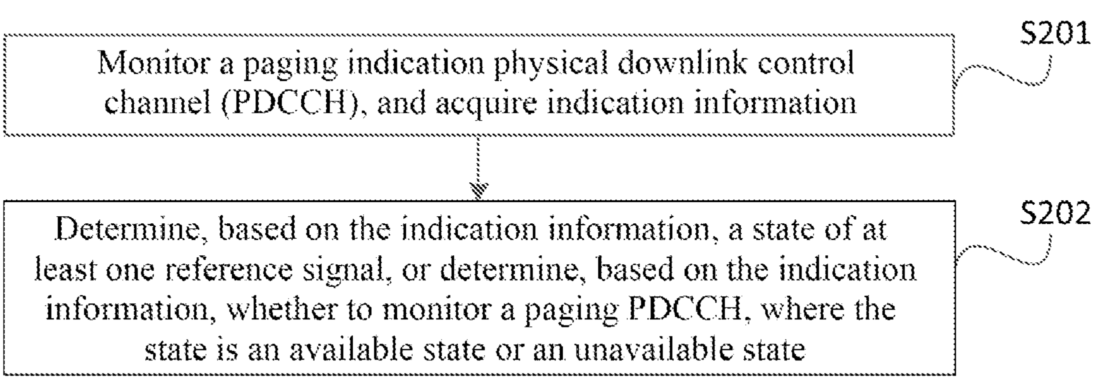
FIG. 2 is a schematic flowchart of a communication method according to an embodiment of the present disclosure.

FIG. 2 is a first schematic flowchart of a communication method according to an embodiment of the present disclosure. As shown in FIG. 2, the communication method according to the embodiment includes:

S201, monitor a paging indication (PI) physical downlink control channel (PDCCH), and acquire indication information.

In an implementation, an execution subject of the embodiment of the present disclosure may be a terminal device, or may be a communication apparatus in the terminal device, and the state determining apparatus may be implemented by a combination of software and/or hardware. The paging indication PDCCH may also be called a paging early indication (PEI) PDCCH.

In a possible design, the paging indication PDCCH is monitored to acquire indication information before at least one paging frame (PF) or paging occasion (PO).

Monitoring the paging indication PDCCH before at least one PF or PO can be implemented in any one of the following feasible manner 10 and manner 11.

Manner 11, monitor the paging PDCCH before at least one PF or PO includes: monitoring the paging indication PDCCH on a paging indication PDCCH monitoring occasion. The paging indication PDCCH monitoring occasion is before at least one PF or PO, and is closest to a first PF of the at least one PF or closest to a first PO of the at least one PO.

Manner 12, monitor the paging indication PDCCH before at least one PF or PO includes: monitoring the paging indication PDCCH on a paging indication PDCCH monitoring occasion. The paging indication PDCCH monitoring occasion is before at least one PF or PO, and is closest to a first PF of the at least one PF or closest to a first PO of the at least one PO, and has a full duration. The full duration is specified by a higher-layer parameter of a paging indication PDCCH search space.

In Rel-15 new radio (NR), a PO includes at least one PMO, where the PMO is associated with the SSB one by one. That is, in a PO, a K-th PMO is associated with a K-th SSB, where a value of K is 1–X, X is the total number of PMOs included in a PO.

S202, determine, based on the indication information, a state of at least one reference signal, or determine, based on the indication information, whether to monitor a paging PDCCH, where the state is an available state or an unavailable state.

In an implementation, at least one reference signal may be configured to correspond to the SSB (with a QCL relationship) through transmission configuration indication (TCI), where the TC is sent from a network device to a network device. The at least one reference signal includes a tracking reference signal (TRS) and/or a channel state information-reference signal (CSI-RS). A CSI-RS may be composed of a CSI-RS resource. A TRS may be composed of 4 CSI-RS resources in 2 slots, where there are 2 CSI-RS resources in a slot; or, a TRS may be composed of 2 CSI-RS resources in 1 slot.

Specifically, the indication information can be used in any one of the following manner 21 to manner 24.

Manner 21: determine the state of the at least one reference signal based on the indication information.

Manner 22: determine whether to monitor the paging PDCCH based on the indication information.

Manner 23, when it is determined to monitor the paging PDCCH based on the indication information, determine that the state of the at least one reference signal is an available state. In this way, when the terminal device determines to monitor the paging PDCCH based on the indication information, it can determine that the state of the at least one reference signal is available. At this time, the indication information indicates whether to monitor the paging PDCCH and the state of the at least one reference signal simultaneously. In this way, the number of bits of the indication information can be saved.

Manner 24, when it is determined to monitor the paging PDCCH base on the indication information, determine the state of the at least one reference signal based on a predefined rule, where the state is an available state or an unavailable state. In this way, when the terminal device determines to monitor the paging PDCCH based on the indication information, the state of the at least one reference signal can be determined based on the predefined rule. At this time, the indication information indicates whether to monitor the paging PDCCH and the state of the at least one reference signal simultaneously. The predefined rule includes that the reference signal is only valid on a part of a configuration occasion, for example, it is valid on the configuration occasion within a window or within a period of time.

Manner 25, determine the state of the at least one reference signal and whether to monitor the paging PDCCH based on the indication information. At this time, the indication information includes multiple bits, the terminal device determines the state of the at least one reference signal through at least one bit in the indication information, and the terminal device determines whether to monitor the paging PDCCH through the at least one bit in the indication information. In this way, the indication can be more flexible.

For manner 21, manner 23, manner 24 and manner 25, determining the state of the at least one reference signal includes any one of the following manner 210 to manner 216 (since the paging monitoring occasion (PMO) refers to a monitoring occasion of the paging PDCCH, so the paging monitoring occasion (PMO) and the paging PDCCH will not be distinguished below):

Manner 210, determine a state of at least one reference signal corresponding to a synchronization signal block (SSB) associated with a paging monitoring occasion (PMO). In an implementation, the paging monitoring occasion (PMO) is associated with the paging indication PDCCH which carries the indication information. In an implementation, the association relationship between the paging monitoring occasion (PMO) and the paging indication PDCCH, which carries the indication information, is that: the paging monitoring occasion (PMO) and the paging indication PDCCH, which carries the indication information, are associated with a same synchronization signal block SSB.

Manner 2101, determine states of all reference signals corresponding to the synchronization signal block (SSB) associated with the paging monitoring occasion (PMO). The synchronization signal block (SSB), which is associated with the paging monitoring occasion (PMO), may correspond to multiple reference signals, and the terminal device determines the states of all the corresponding reference signals, which can save communication system overhead.

Manner 2012, determine the state of one reference signal corresponding to the synchronization signal block (SSB) associated with the paging monitoring occasion (PMO). The synchronization signal block (SSB), which is associated with the paging monitoring occasion (PMO), may only correspond to one reference signal, and the terminal device can determine the state of the corresponding reference signal, which can be more targeted and accurate.

Manner 211, determine that the state of the at least one reference signal is an available state before a paging monitoring occasion (PMO) or before a paging occasion (PO). In an implementation, the paging monitoring occasion (PMO) is associated with the paging indication PDCCH which carries the indication information. In an implementation, the association relationship between the paging monitoring occasion (PMO) and the paging indication PDCCH, which carries the indication information, is that: the paging monitoring occasion (PMO) and the paging indication PDCCH, which carries the indication information, are associated with a same synchronization signal block SSB. In an implementation, the paging occasion (PO) is associated with the paging indication PDCCH which carries the indication information.

Manner 212, determine that the state of the at least one reference signal is an available state after a first reference point. A distance between the first reference point and a paging monitoring occasion (PMO) or a paging occasion (PO) is a first offset.

Manner 213, determine that the state of the at least one reference signal is an available state before a second reference point. A distance between the second reference point and a PMO or a PO is a second offset.

Manner 214, determine that the state of the at least one reference signal is an available state before the paging indication PDCCH.

Manner 215, determine that the state of the at least one reference signal is an available state after a third reference point, where a distance between the third reference point and the paging indication PDCCH is a third offset.

Manner 216, determine that the state of the at least one reference signal is an available state after a fourth reference point, where a distance between the fourth reference point and the paging indication PDCCH is a fourth offset.

On the basis of manner 210, there is any one of the following two configuration manners, namely manner 101 and manner 102, for the indication information.

Manner 101, the indication information is 1 bit, where the 1 bit indicates states of all reference signals corresponding to the synchronization signal block (SSB) associated with the paging monitoring occasion (PMO). In this way, the communication system overhead can be saved.

Manner 102, the indication information is more than 1 bit, where each 1 bit indicates a state of one reference signal corresponding to the synchronization signal block (SSB) associated with the paging monitoring occasion (PMO). Although in this way, the communication system overhead may be wasted, the indication information is more accurate.

For manner 21, manner 22, manner 23, manner 24 and manner 25, any one of the following manner 221 to manner 224 can be implemented:

Manner 221, when the indication information is a first preset value, monitor the paging PDCCH in a PF. The indication information is carried by 1 bit.

Manner 222, when the indication information is a first preset value, monitor the paging PDCCH in a PO. The indication information is carried by 1 bit.

Manner 223, when the indication information is a first preset value, monitor the paging PDCCH in a PO subgroup or a PO to which the PO subgroup belongs. The indication information is carried by 1 bit.

Manner 224, monitor the paging indication PDCCH in a monitoring occasion.

The monitoring occasion can be realized in any one of the following manner 2241 to manner 2251.

Manner 2241, the monitoring occasion is before at least one paging frame (PF). Before the at least one paging frame (PF), although granularity of the monitoring occasion is coarse, the system overhead is reduced.

Manner 2242, the monitoring occasion is before at least one PF and is closest to a first PF of the at least one PF. In this way, the monitoring of the paging indication PDCCH can be started as soon as possible.

Manner 2243, the monitoring occasion is before at least one PF and is closest to a first PF of the at least one PF, and has a full duration. In this way, the monitoring of the paging indication PDCCH can be started as soon as possible, and the paging indication PDCCH has a full duration (which improves reliability).

Manner 2244, the monitoring occasion is before at least one paging occasion (PO). Before the at least one paging frame PF, although the system overhead is large, granularity of the monitoring occasion is fine.

Manner 2245, the monitoring occasion is before at least one PO and is closest to a first PO of the at least one PO. In this way, the monitoring of the paging indication PDCCH can be started as soon as possible.

Manner 2246, the monitoring occasion is before at least one PO and is closest to a first PO of the at least one PO, and has a full duration. In this way, the monitoring of the paging indication PDCCH can be started as soon as possible, and the paging indication PDCCH has a full duration (which improves reliability).

Manner 2247, the monitoring occasion is before the PF or PO to be monitored.

Manner 2248, the monitoring occasion is on a configured paging PDCCH monitoring occasion before the PF or PO to be monitored. The configured paging PDCCH monitoring occasion is configured by a high-layer parameter, such as a search space set parameter. Using the configured paging PDCCH monitoring occasion as the monitoring occasion can simplify the system complexity. The network device only needs to configure the paging PDCCH monitoring occasion, and the terminal device can monitor the paging indication PDCCH while monitoring the paging PDCCH.

Manner 2249, the monitoring occasion is on a configured paging indication PDCCH monitoring occasion before and closest to the PF or PO to be monitored. The configured paging indication PDCCH monitoring occasion is configured by a high-layer parameter, such as a search space set parameter. In this way, the terminal device starts to monitor the paging PDCCH as soon as possible after monitoring the paging monitoring PDCCH, if the indication information indicates that the terminal device needs to monitor the paging PDCCH.

Manner 2250, the monitoring occasion is on a configured paging indication PDCCH monitoring occasion before the PF or PO to be monitored and after a paging indication reference point. The configured paging indication PDCCH monitoring occasion is configured by a high-layer parameter, such as a search space set parameter. A distance between the paging indication reference point and the PF or PO to be monitored is a paging indication offset, and the paging indication offset is configured by a high-layer parameter. In an implementation, the paging indication offset is several milliseconds or slots or symbols. In this way, the paging indication monitoring occasion cannot be too far from the PF or PO to be monitored, and the terminal device can further perform time-frequency synchronization through the synchronization signal block and/or reference signal, and successfully receive the paging PDCCH and/or PDSCH.

Manner 2251, the monitoring occasion is on a configured paging indication PDCCH monitoring occasion before the PF or PO to be monitored and after a paging indication reference point. The configured paging indication PDCCH monitoring occasion is configured by a high-layer parameter, such as a search space set parameter. A distance between the paging indication reference point and the PF or PO to be monitored is a paging indication offset, and the paging indication offset is configured by a high-layer parameter. The paging indication PDCCH has a full duration. In an implementation, the paging indication offset is several milliseconds or slots or symbols. The paging indication PDCCH has a full duration, which improves reliability.

Manner 2252, the monitoring occasion is on a configured paging indication PDCCH monitoring occasion before a minimum interval reference point and after a paging indication reference point. The configured paging indication PDCCH monitoring occasion is configured by a high-layer parameter, such as a search space set parameter. A distance between the minimum interval reference point and the PF or PO to be monitored is a minimum interval offset, and the minimum interval offset is configured by a high-layer parameter. In an implementation, the minimum interval offset is several milliseconds or slots or symbols. In this way, the paging indication PDCCH monitoring occasion cannot be too close to the PF or PO to be monitored, so that the terminal device can enter deep sleep.

Manner 2253, the monitoring occasion is on a configured paging indication PDCCH monitoring occasion before a minimum interval reference point. The configured paging indication PDCCH monitoring occasion is configured by a high-layer parameter, such as a search space set parameter. A distance between the minimum interval reference point and the PF or PO to be monitored is a minimum interval offset, and the minimum interval offset is configured by a high-layer parameter. The paging indication PDCCH has a full duration. In an implementation, the minimum interval offset is several milliseconds or slots or symbols. The paging indication PDCCH has a full duration, which improves reliability.

Manner 2254, the monitoring occasion is on a configured paging indication PDCCH monitoring occasion after a paging indication reference point and before a minimum interval reference point. The configured paging indication PDCCH monitoring occasion is configured by a high-layer parameter, such as a search space set parameter. A distance between the minimum interval reference point and the PF or PO to be monitored is a minimum interval offset, and the minimum interval offset is configured by a high-layer parameter. A distance between the paging indication reference point and the PF or PO to be monitored is a paging indication offset, and the paging indication offset is configured by a high-layer parameter. In an implementation, the minimum interval offset is several milliseconds or slots or symbols, and the paging indication offset is several milliseconds or slots or symbols. In this way, the paging indication monitoring occasion cannot be too far from the PF or PO to be monitored, and the terminal device can further perform time-frequency synchronization through the synchronization signal block and/or reference signal, and successfully receive the paging PDCCH and/or PDSCH. The paging indication PDCCH monitoring occasion cannot be too close to the PF or PO to be monitored, so that the terminal device can enter deep sleep.

Manner 2255, the monitoring occasion is on a configured paging indication PDCCH monitoring occasion after a paging indication reference point and before a minimum interval reference point. The configured paging indication PDCCH monitoring occasion is configured by a high-layer parameter, such as a search space set parameter. A distance between the minimum interval reference point and the PF or PO to be monitored is a minimum interval offset, and the minimum interval offset is configured by a high-layer parameter. A distance between the paging indication reference point and the PF or PO to be monitored is a paging indication offset, and the paging indication offset is configured by a high-layer parameter. The paging indication PDCCH has a full duration. In an implementation, the minimum interval offset is several milliseconds or slots or symbols, and the paging indication offset is several milliseconds or slots or symbols. The paging indication PDCCH has a full duration, which improves reliability.

In an implementation, the indication information may also be carried by the paging indication PDCCH, or may also be carried by downlink control information (DCI) corresponding to the paging indication PDCCH. The DCI corresponding to the paging indication PDCCH may also be called paging indication DCI. It will be called DCI for short subsequently.

For example, when the indication information is carried by the DCI, in S202, on the basis of the above manner 21, manner 22, manner 23, manner 24 and manner 25, the indication information can be acquired in the following manner: determining a start position and/or a length of the indication information in DCI, where the DCI is carried on the paging indication PDCCH; and acquiring the indication information from the DCI based on the start position and/or the length.

The start position and/or the length of the indication information in the DCI can be determined in any one of the following manner 2021 to manner 2025:

Manner 2021: determine the start position and/or the length of the indication information in the DCI based on a high-layer signaling. In an implementation, the high-layer signaling may be sent by the network device to the terminal device, and the high-layer signaling configures the start position and the length of the indication information in the DCI.

Manner 2022: determine the start position and/or the length of the indication information in the DCI based on a paging frame PF or a paging occasion PO that needs to be monitored.

Manner 2023: determine the start position and/or the length of the indication information in the DCI based on a high-layer signaling and a paging frame PF or a paging occasion PO that needs to be monitored.

Manner 2024: determine the start position and/or the length of the indication information in the DCI based on a PO subgroup to which the terminal device belongs.

Manner 2025, acquire the indication information in a medium access control (MAC) signaling, an MAC packet data unit PDU, or an MAC control element CE. The indication information may use a bit in the MAC signaling, a bit in the MAC PDU, or a bit in the MAC CE. When the indication information uses the bit in the MAC signaling, the MAC PDU, or the MAC CE, the number of bits used in the indication information can be more, and it is suitable for a case when there is a paging message in the physical downlink shared channel (PDSCH).

In the foregoing manner 2021 to manner 2024, the configuration manner of the indication information in the DCI may be any one of the following manner 20111 to manner 20114.

Manner 20111, the indication information is carried by a reserved bit in the DCI or a DCI format, such as DCI format 1-0.

Manner 20112, when the DCI does not carry scheduling information, the indication information is carried by a reserved bit in a field in the DCI or in a DCI format corresponding to the DCI. The DCI format may be DCI format 1-0, because DCI format 1-0 is more commonly used in an idle state.

Manner 20113, when allocation of a frequency domain resource in the DCI is invalid, the indication information is carried by a bit of a redefined field in the DCI or a DCI format corresponding to the DCI. The DCI format may be DCI format 1-0, because DCI format 1-0 is more commonly used in an idle state.

Manner 20114, when the DCI does not carry scheduling information and allocation of a frequency domain resource in the DCI is invalid, the indication information is carried by a bit of a redefined field in the DCI or a DCI format corresponding to the DCI. The DCI format may be DCI format 1-0, because DCI format 1-0 is more commonly used in an idle state.

For the above manner 24, any one of manner 241 to manner 248 can be used to determine the state of the at least one reference signal based on the predefined rule.

Manner 241, determine that the state of the at least one reference information is available within a window before the PMO (or PO).

Manner 242, determine that the state of the at least one reference signal corresponding to the SSB associated with the PMO (or PO) is an available state after a first reference point. A distance between the first reference point to the PMO (or PO) is a first offset. At this time, the first offset may include a zero and non-zero positive number. In an implementation, the first reference point is before the PMO (or PO), and the distance between the first reference point and the PMO (or PO) is the first offset. At this time, the first offset may include a non-zero positive number.

Manner 243, determine that the state of the at least one reference signal corresponding to the SSB associated with the PMO (or PO) is an available state within a first window. The first window is a window with a first reference point before the PMO (or PO) as a start point.

Manner 244, determine that the state of the at least one reference signal corresponding to the SSB associated with the PMO (or PO) is an available state before a second reference point. A distance between the second reference point and the PMO (or PO) is a second offset. At this time, the second offset may include a zero and non-zero positive number. In an implementation, the second reference point is before the PMO (or PO), and the distance between the second reference point and the PMO (or PO) is the second offset. At this time, the second offset may include a non-zero positive number.

Manner 245, determine that the state of the at least one reference signal corresponding to the SSB associated with the PMO (or PO) is an available state within a second window. The second window is a window with a second reference point before the PMO (or PO) as an end point.

In the present disclosure, the terminal device may only consider the state of the at least one reference signal within the window before the PMO (or PO) to be an available state or an unavailable state. In this way, the overhead of at least one reference signal can be further reduced.

In the present disclosure, the terminal device may only consider the state of the at least one reference signal before the PMO (or PO) and after a first reference point, whose distance from the PMO (or PO) is a first offset, to be an available state. In this way, the terminal device can be avoided to use at least one reference signal that is too far away from the PMO (or PO). When the terminal device uses at least one reference signal that is too far away from the PMO (or PO), there is no energy-saving gain, and the communication system overhead is increased.

In the present disclosure, the terminal device may only consider the state of the at least one reference signal before the PMO (or PO) and before a second reference point, whose distance from the PMO (or PO) is a second offset, to be an available state. In this way, the terminal device can be avoided to use at least one reference signal that is too close to the PMO (or PO). When the terminal device uses the at least one reference signal that is too close to the PMO (or PO), even if the terminal device uses the at least one reference signal to perform AGC adjustment/time-frequency synchronization, it cannot be applied to reception of the PDCCH in time.

Manner 246, determine that the state of the at least one reference signal is an available state before the paging indication PDCCH. That is, it is determined that a state of at least one piece of reference information is an available state within a window before the paging indication PDCCH monitoring occasion.

Manner 247, determine that the state of the at least one reference signal is an available state after a third reference point. A distance between the third reference point and the paging indication PDCCH monitoring occasion is a third offset. At this time, the third offset may include a zero and non-zero positive number. In an implementation, the third reference point is before the paging indication PDCCH monitoring occasion, and the distance between the third reference point and the paging indication PDCCH monitoring occasion is a third offset. At this time, the third offset may include a non-zero positive number.

Manner 248, determine that the state of the at least one reference signal is an available state before a fourth reference point. A distance between the fourth reference point and the paging indication PDCCH monitoring occasion is a fourth offset. At this time, the fourth offset may include a zero and non-zero positive number. In an implementation, the fourth reference point is before the paging indication PDCCH monitoring occasion, and the distance between the fourth reference point and the paging indication PDCCH monitoring occasion is a fourth offset. At this time, the fourth offset may include a non-zero positive number.

It should be noted that, for a given terminal device, the paging indication PDCCH can be sent in the same way as the SSB by a scanning beam. The paging indication PDCCH monitoring occasion is associated with the SSB one by one. That is, a K-th paging indication PDCCH monitoring occasion is associated with a K-th SSB, where a value of K is 1–X, X is the number of paging indication PDCCH monitoring occasions in a paging indication monitoring period.

In the present disclosure, the terminal device may only consider the state of the at least one reference signal within the window before the paging indication PDCCH monitoring occasion to be an available state or an unavailable state. In this way, the overhead of at least one reference signal can be further reduced.

In the present disclosure, the terminal device may only consider the state of the at least one reference signal before the paging indication PDCCH monitoring occasion and after a third reference point, whose distance from the paging indication PDCCH monitoring occasion is a third offset, to be an available state. In this way, the terminal device can be avoided to use at least one reference signal that is too far away from the paging indication PDCCH monitoring occasion, which may cause no energy-saving gain for the terminal device, and increasing of the communication system overhead.

In the present disclosure, the terminal device may only consider the state of the at least one reference signal before the paging indication PDCCH monitoring occasion and after a fourth reference point, whose distance from the paging indication PDCCH monitoring occasion is a fourth offset, to be an available state, so that the terminal device is avoided to use at least one reference signal that is too close to the paging indication PDCCH monitoring occasion. In practice, when a terminal device uses the at least one reference signal that is too close to the paging indication PDCCH monitoring occasion, even if the terminal device uses the at least one reference signal to perform AGC adjustment/time-frequency synchronization, it cannot be applied to reception of the PDCCH in time.

In the foregoing manner 22 and manner 23, the indication information can also be acquired in the DCI in the following manner 25 to manner 38.

Manner 25: configure the start position and/or the length of the indication information in the DCI directly through a high-layer signaling, and acquire the indication information from the DCI based on the start position and/or the length. In an implementation, the high-layer signaling may be sent by the network device to the terminal device. For example, if the length of the DCI is 10 bits, the start position is a third bit, and if the length is 2 bits, then the third bit and the fourth bit in the DCI are indication information.

Mode 26, derive the start position and/or the length of the indication information in the DCI based on a high layer signaling, and acquire the indication information from the DCI based on the start position and/or the length. For example, the terminal device may derive the position of its own PF or PO among the possible PFs or POs through the paging configuration information, thereby deriving the start position and the length of the indication information in the DCI. The possible PFs or POs are possible PFs or POs in a paging cycle (at this time, the DCI corresponds to all PFs or POs in the paging cycle), or possible PFs or POs between the paging indication PDCCH to the next paging indication PDCCH (at this time, the DCI corresponds to all PFs or POs between a current paging indication PDCCH and a next paging indication PDCCH); or possible PFs or POs between the paging indication PDCCH to a termination reference point (configured by a termination offset) after the paging indication PDCCH (through the termination reference point, which can avoid excess possible PFs or POs); or possible PFs or POs between a start reference point (configured by the start offset) after the paging indication PDCCH to the next paging indication PDCCH (by using the start reference point, which can prevent the PF or PO closer to the current paging indication PDCCH from being counted as possible PFs or POs, because if the indication information is for the PF or PO closer to the current paging indication PDCCH, the energy-saving gain is not large); or possible PFs or POs between a start reference point (configured by a start offset) after the paging indication PDCCH and a termination reference point (configured by a termination offset) after the paging indication PDCCH (by using the termination reference point and the start reference point, which can not only prevent excess possible PFs or POs, but can also prevent the PF or PO that is closer to the current paging indication PDCCH from being counted as possible PFs or POs). In an implementation, the length can also be determined by a predefined rule. In this way, a high-layer signaling can be simplified. In an implementation, when the indication information does not exist in the DCI, the terminal device may not monitor the PDCCH corresponding to the DCI. In this way, the computing complexity of the terminal device can be reduced.

Manner 27: determine the start position and/or the length of the indication information in the DCI based on the PF or PO that the terminal device needs to monitor, and acquire the indication information from the DCI based on the start position and/or the length. In an implementation, the terminal device may derive the start position and/or the length of the indication information in the DCI based on the PF or PO that it needs to monitor. For example, the terminal device derives the position of its own PF or PO among possible PFs or POs, and further derives the start position and the length of the indication information in the DCI. The possible PFs or POs are possible PFs or POs in a paging cycle: or possible PFs or POs between the paging indication PDCCH to the next paging indication PDCCH; or possible PFs or POs between the paging indication PDCCH to a termination reference point (configured by a termination offset) after the paging indication PDCCH; or possible PFs or POs between a start reference point (configured by the start offset) after the paging indication PDCCH to the next paging indication PDCCH; or possible PFs or POs between a start reference point (configured by a start offset) after the paging indication PDCCH and a termination reference point (configured by a termination offset) after the paging indication PDCCH. In an implementation, the length can also be determined by a predefined rule. Since for a high-layer signaling, it is difficult to configure for a single terminal device in the idle state, the signaling can be simplified through derivation by the terminal device. In an implementation, when the indication information does not exist in the DCI, the terminal device may not monitor the PDCCH corresponding to the DCI. In this way, the computing complexity of the terminal device can be reduced.

Manner 28: determine the start position and/or the length of the indication information in the DC based on a high-layer signaling and the PF or PO that the terminal device needs to monitor, and acquire the indication information from the DCI based on the start position and/or the length. For example, the terminal device derives the number of possible PFs or POs corresponding to the DCI through the paging configuration information, thereby deriving the position of its own PF or PO among the possible PFs or POs, and further deriving the start position and the length of the indication information in the DCI. The possible PFs or POs are possible PFs or POs in a paging cycle; or possible PFs or POs between the paging indication PDCCH to the next paging indication PDCCH: or possible PFs or POs between the paging indication PDCCH to a termination reference point (configured by a termination offset) after the paging indication PDCCH; or possible PFs or POs between a start reference point (configured by the start offset) after the paging indication PDCCH to the next paging indication PDCCH; or possible PFs or POs between a start reference point (configured by a start offset) after the paging indication PDCCH and a termination reference point (configured by a termination offset) after the paging indication PDCCH. In an implementation, the length can also be determined by a predefined rule. In this way, a compromise between signaling control and signaling simplification can be achieved. In an implementation, when the indication information does not exist in the DCI, the terminal device may not monitor the PDCCH corresponding to the DCI. In this way, the computing complexity of the terminal device can be reduced.

In an implementation, in the above manner 26, manner 27, and manner 28, the terminal device can also derive the start position and/or the length of the indication information in the DCI based on a PO subgroup (which is a subgroup or a subset of the terminal device group in the corresponding PO), to which the terminal device belongs. For example, the terminal device first derives the start position and/or the length of the PO to which the indication information belongs in the DCI, and then derives the start position and/or the length of the indication information in the DCI based on the PO subgroup to which it belongs. In an implementation, when the indication information does not exist in the DCI, the terminal device may not monitor the PDCCH corresponding to the DCI. In this way, the computing complexity of the terminal device can be reduced.

Manner 29, the terminal device derives a total length of the DCI based on a high-layer signaling, and acquires the indication information from the DCI based on the total length. Only when the total length of the DCI is obtained, the terminal device can normally decode the DCI. For example, the terminal device can derive the number of possible PFs or POs through the paging configuration information, thereby deriving the total length of the DCI. The possible PFs or POs are possible PFs or POs in a paging cycle (at this time, the DCI corresponds to all PFs or POs in the paging cycle): or possible PFs or POs between the paging indication PDCCH to the next paging indication PDCCH (at this time, the DCI corresponds to all PFs or POs between a current paging indication PDCCH and a next paging indication PDCCH); or possible PFs or POs between the paging indication PDCCH to a termination reference point (configured by a termination offset) after the paging indication PDCCH (through the termination reference point, which can avoid excess possible PFs or POs); or possible PFs or POs between a start reference point (configured by the start offset) after the paging indication PDCCH to the next paging indication PDCCH (by using the start reference point, which can prevent the PF or PO closer to the current paging indication PDCCH from being counted as possible PFs or POs, because if the indication information is for the PF or PO closer to the current paging indication PDCCH, the energy-saving gain is not large); or possible PFs or POs between a start reference point (configured by a start offset) after the paging indication PDCCH and a termination reference point (configured by a termination offset) after the paging indication PDCCH (by using the termination reference point and the start reference point, which can not only prevent excess possible PFs or POs, but can also prevent the PF or PO that is closer to the current paging indication PDCCH from being counted as possible PFs or POs). In an implementation, the length can also be determined by a predefined rule. In this way, a high-layer signaling can be simplified. In an implementation, when the indication information does not exist in the DCI, the terminal device may not monitor the PDCCH corresponding to the DCI. In this way, the computing complexity of the terminal device can be reduced.

In an implementation, in the above manner 29, the terminal device can also derive the total length of the DCI based on a parameter of a PO subgroup (which is a subgroup or a subset of the terminal device group in the corresponding PO), and can acquire the indication information based on the total length. For example, the terminal device first derives the number of possible PFs or POs, and then derives the total length of the DCI based on a PO subgroup parameter (for example, the number of PO subgroups in the PO). In an implementation, when the indication information does not exist in the DCI, the terminal device may not monitor the PDCCH corresponding to the DCI. In this way, the computing complexity of the terminal device can be reduced.

Manner 31: the terminal device determines the start position and/or the length of the indication information in the DCI based on the PF to be monitored, and acquires the indication information from the DCI based on the start position and/or the length. When the indication information is a first preset value, it is determined to monitor the paging PDCCH in a PF. In an implementation, when the indication information is a second preset value, it is determined not to monitor the paging PDCCH in the PF.

In a possible design, the indication information is carried by 1 bit. In a possible design, each 1 bit in the DCI corresponds to a PF. In a possible design, 1 bit in the DCI is acquired, and when 1 bit is the first preset value, the paging PDCCH is monitored in the PF corresponding to the 1 bit. In an implementation, when the 1 bit is the second preset value, it is determined not to monitor the paging PDCCH in the PF corresponding to the 1 bit. In the present disclosure, each 1 bit in the DCI corresponds to a PF. Although the bit can be saved, the indication granularity is relatively coarse, which is a PF.

Manner 32: the terminal device determines the start position and/or the length of the indication information in the DCI based on the paging occasion (PO) to be monitored, and acquires the indication information from the DCI based on the start position and/or the length. When the indication information is a first preset value, it is determined to monitor the paging PDCCH in the PO. In an implementation, when the indication information is a second preset value, it is determined not to monitor the paging PDCCH in the PO.

In a possible design, the indication information is carried by 1 bit. In a possible design, each 1 bit in the DCI corresponds to a PO. In a possible design, 1 bit in the DCI is acquired, and when the 1 bit is the first preset value, it is determined to monitor the paging PDCCH in the PO corresponding to the 1 bit. In an implementation, when the 1 bit is the second preset value, it is determined not to monitor the paging PDCCH in the PO corresponding to the 1 bit. In the present disclosure, each 1 bit in the DCI corresponds to a PO. Although more bits are used, the indication granularity is finer, which is a PO.

Manner 33: the terminal device determines the start position and/or the length of the indication information in the DCI based on a PO subgroup to be monitored, and acquires the indication information from the DCI based on the start position and/or the length. The PO subgroup is a subgroup or subset of a terminal device group in the corresponding PO. When the indication information is a first preset value, it is determined to monitor the paging PDCCH in the PO subgroup or the PO to which the PO subgroup belongs. In an implementation, when the indication information is a second preset value, it is determined not to monitor the paging PDCCH in the PO subgroup or the PO to which the PO subgroup belongs. In a possible design, the indication information is carried by 1 bit. In a possible design, each 1 bit in the DCI corresponds to a PO subgroup. In a possible design, 1 bit in the DCI is acquired, and when the 1 bit is the first preset value, it is determined to monitor the paging PDCCH in the PO subgroup corresponding to the 1 bit or the PO to which the corresponding PO subgroup belongs. In an implementation, when the 1 bit is the second preset value, it is determined not to monitor the paging PDCCH in the PO subgroup corresponding to the 1 bit or the PO to which the corresponding PO subgroup belongs. In the present disclosure, each 1 bit in the DCI corresponds to a PO subgroup. Although more bits are used, the indication granularity is finer, which is a PO subgroup.

In an implementation, the first preset value may be 1 or 0, and the second preset value may also be 1 or 0. For example, when the first preset value is 1, the second preset value is 0, and when the first preset value is 0, the second preset value is 1.

The terminal device can wake up and monitor the paging indication PDCCH before X PFs or POs, so that the terminal device can know whether it needs to wake up and monitor the paging PDCCH before subsequent X PFs or POs, which reduces power consumption of the terminal device.

Manner 34: the terminal device determines the start position and/or the length of the indication information in the DCI based on the PF to be monitored, and acquires the indication information from the DCI based on the start position and/or the length. When the indication information is a first preset value, it is determined to monitor the paging PDCCH in a PF. In an implementation, when the indication information is a second preset value, it is determined not to monitor the paging PDCCH in the PF.

In a possible design, the indication information is carried by 1 bit.

In a possible design, the DCI includes X bits, and each 1 bit corresponds to a PF.

In a possible design, 1 bit among the X bits is acquired, and when the 1 bit is a first preset value, the paging PDCCH is monitored in the PF corresponding to the 1 bit. In an implementation, when the 1 bit is a second preset value, it is determined not to monitor the paging PDCCH in the PF corresponding to the 1 bit.

In the present disclosure, the DCI includes X bits. Although bits can be saved, the indication granularity is relatively coarse, which is a PF.

Manner 35: the terminal device determines the start position and/or the length of the indication information in the DCI based on the PO to be monitored, and acquires the indication information from the DCI based on the start position and/or the length. When the indication information is a first preset value, it is determined to monitor the paging PDCCH in the PO. In an implementation, when the indication information is a second preset value, it is determined not to monitor the paging PDCCH in the PO.

In a possible design, the indication information is carried by 1 bit.

In a possible design, the DCI includes Y bits, where Y is equal to a product of X and M, M is the total number of paging occasions configured in a PF, and each 1 bit in the Y bits corresponds to a PO.

In a possible design, 1 bit among the Y bits is acquired, and when the 1 bit is the first preset value, the paging PDCCH is monitored in the PO corresponding to the 1 bit. In an implementation, when the 1 bit is the second preset value, it is determined not to monitor the paging PDCCH in the PO corresponding to the 1 bit.

In the present disclosure, the DCI includes Y bits. Although more bits are used, the indication granularity is finer, which is a PO.

Manner 36: the terminal device determines the start position and/or the length of the indication information in the DCI based on a PO subgroup to be monitored, and acquires the indication information from the DCI based on the start position and/or the length. The PO subgroup is a subgroup or subset of a terminal device group in the corresponding PO. When the indication information is a first preset value, it is determined to monitor the paging PDCCH in the PO subgroup or the PO to which the PO subgroup belongs. In an implementation, when the indication information is a second preset value, it is determined not to monitor the paging PDCCH in the PO subgroup or the PO to which the PO subgroup belongs.

In a possible design, the indication information is carried by 1 bit.

In a possible design, the DCI includes Z bits, where Z is equal to a product of X, M and L, where M is the total number of POs configured in a PF, and L is the total number of PO subgroups configured in a PO. Each 1 bit among the Z bits corresponds to a PO subgroup.

In a possible design, 1 bit among the Z bits is acquired, and when the 1 bit is the first preset value, the paging PDCCH is monitored in the PO subgroup corresponding to the 1 bit or the PO to which the corresponding PO subgroup belongs. In an implementation, when the 1 bit is the second preset value, it is determined not to monitor the paging PDCCH in the PO subgroup corresponding to the 1 bit or the PO to which the corresponding PO subgroup belongs.

In the present disclosure, the DCI includes Z bits. Although more bits are used, the indication granularity is finer, which is a PO subgroup.

Manner 37, the terminal device determines the start position and/or the length of the indication information in the DCI based on a PO subgroup to be monitored, and acquires the indication information from the DCI based on the start position and/or the length. When the indication information is a first preset value, it is determined to monitor the paging PDCCH in the PO. In an implementation, when the indication information is a second preset value, it is determined not to monitor the paging PDCCH in the PO.

In a possible design, the indication information is carried by 1 bit.

In a possible design, the DCI includes X bits, and each 1 bit corresponds to a PO.

In a possible design, 1 bit among the X bits is acquired, and when the 1 bit is the first preset value, the paging PDCCH is monitored in the PO corresponding to the 1 bit. In an implementation, when the 1 bit is the second preset value, it is determined not to monitor the paging PDCCH in the PO corresponding to the 1 bit.

In the present disclosure, the DCI includes X bits, the indication granularity is a PO. Less bits are used, and the indication granularity is finer, but more DCI bits are required.

Manner 38: the terminal device determines the start position and/or the length of the indication information in the DCI based on a PO subgroup to be monitored, and acquires the indication information from the DCI based on the start position and/or the length. The PO subgroup is a subgroup or subset of a terminal device group in the corresponding PO. When the indication information is a first preset value, it is determined to monitor the paging PDCCH in the PO subgroup or the PO to which the PO subgroup belongs. In an implementation, when the indication information is a second preset value, it is determined not to monitor the paging PDCCH in the PO subgroup or the PO to which the PO subgroup belongs.

In a possible design, the indication information is carried by 1 bit. In a possible design, the DCI includes Z bits, and each 1 bit corresponds to a PO subgroup. The PO subgroup is a subgroup or subset of a terminal device group in the corresponding PO. In a possible design, 1 bit among the Z bits is acquired, and when the 1 bit is the first preset value, it is determined to monitor the paging PDCCH in the PO subgroup corresponding to the 1 bit or the PO to which the corresponding PO subgroup belongs. In an implementation, when the 1 bit is the second preset value, it is determined not to monitor the paging PDCCH in the PO subgroup corresponding to the 1 bit or the PO to which the corresponding PO subgroup belongs. In the present disclosure, the DCI includes Z bits, the indication granularity is a PO subgroup. Less bits are used, and the indication granularity is finer, but more DCI bits are required.

In the above manner, the first preset value may be 1 or 0, and the second preset value may also be 1 or 0. For example, when the first preset value is 1, the second preset value is 0, and when the first preset value is 0, the second preset value is 1.

The communication method according to the embodiment includes: monitoring a paging indication PDCCH, and acquiring indication information, and determining a state of at least one reference signal based on the indication information. The terminal device is enabled to determine the state of the at least one reference signal (that is, whether it is available), thereby saving the power consumption of the terminal device.

The communication method according to the embodiment further includes: monitoring the paging indication PDCCH, and acquiring indication information; and determining whether to monitor a paging PDCCH based on the indication information. The frequency that the terminal equipment wakes up to receive paging can be reduced, thereby saving the power consumption of the terminal device.

Furthermore, in the prior art, in order to shorten the wake-up time of the terminal device, reduce the overhead of the communication system, and increase the capacity of the communication system, the network device usually sends the reference signal, which is sent to the terminal device in the connected state, to the terminal device in the idle state, so that the terminal device in the idle state cannot determine whether the reference signal is available after receiving the reference signal, which further causes the failure of shortening wake-up time of the terminal device, reducing the overhead of a communication system, and improving a capacity of the communication system. In the present disclosure, the terminal device determines the state of the at least one reference signal based on the indication information, which can enable the terminal device to determine whether the reference signal is available, thereby achieving the purpose of shortening the wake-up time of the terminal device, reducing the overhead of the communication system, and improving the capacity of the communication system. That is, a joint optimization of energy saving of the terminal device, reduction of the communication system overhead, and improvement of the communication system capacity is achieved.

Figure 3:
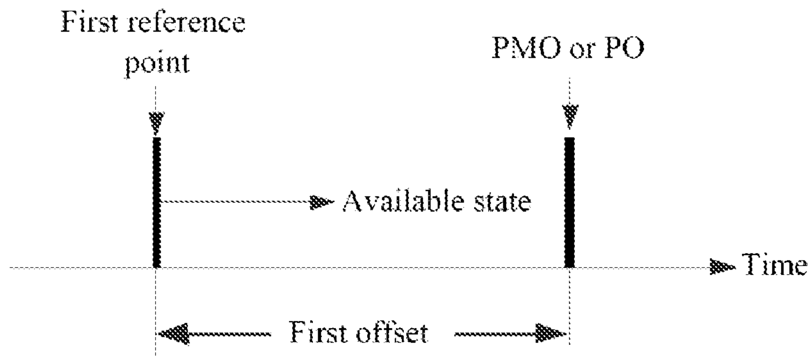
FIG. 3 is a first schematic diagram of a first reference point according to an embodiment of the present disclosure.

FIG. 3 is a first schematic diagram of a first reference point according to an embodiment of the present disclosure. As shown in FIG. 3, a distance between the first reference point to a PMO or PO is a first offset, and after the first reference point, a state of at least one corresponding reference signal is an available state.

Figure 4:
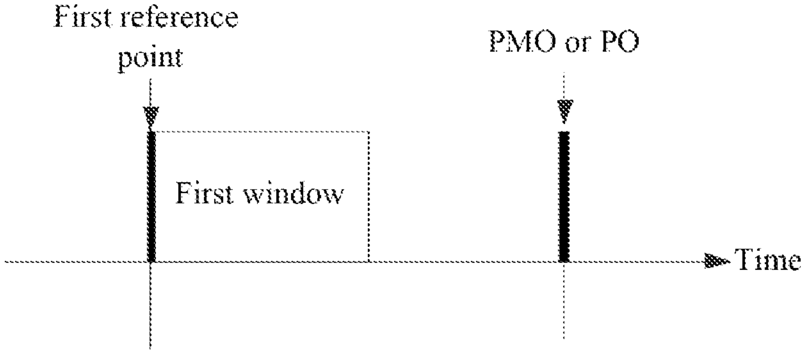
FIG. 4 is a second schematic diagram of a first reference point according to an embodiment of the present disclosure.

FIG. 4 is a second schematic diagram of a first reference point according to an embodiment of the present disclosure. As shown in FIG. 4, within a first window starting from the first reference point, a state of at least one reference signal is an available state.

Figure 5:
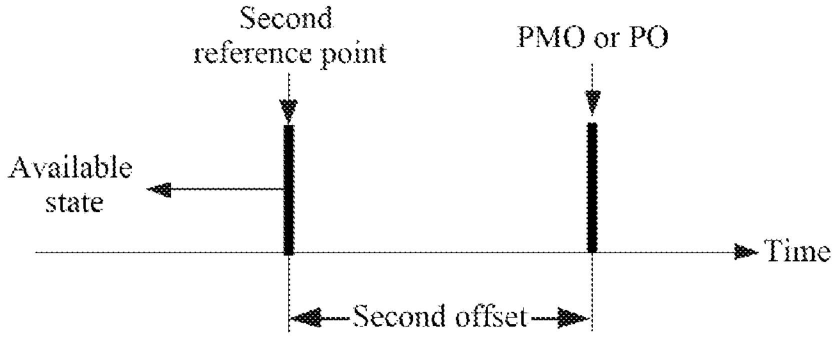
FIG. 5 is a first schematic diagram of a second reference point according to an embodiment of the present disclosure.

FIG. 5 is a first schematic diagram of a second reference point according to an embodiment of the present disclosure. As shown in FIG. 5, a distance between the second reference point to a PMO or PO is a second offset, and after the second reference point, a state of at least one corresponding reference signal is an available state.

Figure 6:
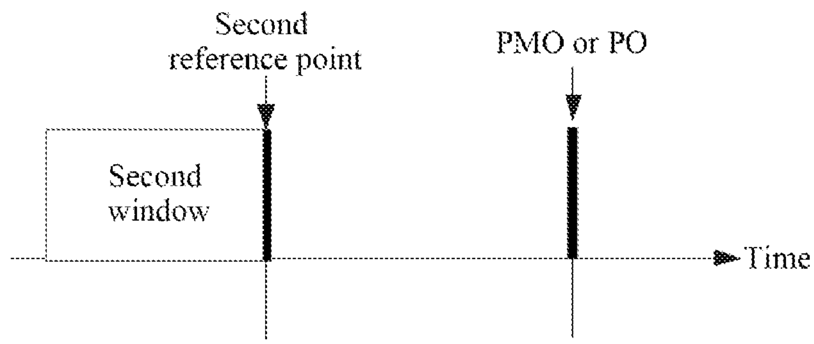
FIG. 6 is a second schematic diagram of a second reference point according to an embodiment of the present disclosure.

FIG. 6 is a second schematic diagram of a second reference point according to an embodiment of the present disclosure. As shown in FIG. 6, for a second window with the second reference point as the end point, after the second reference point, a state of at least one reference signal is an available state.

Figure 7:
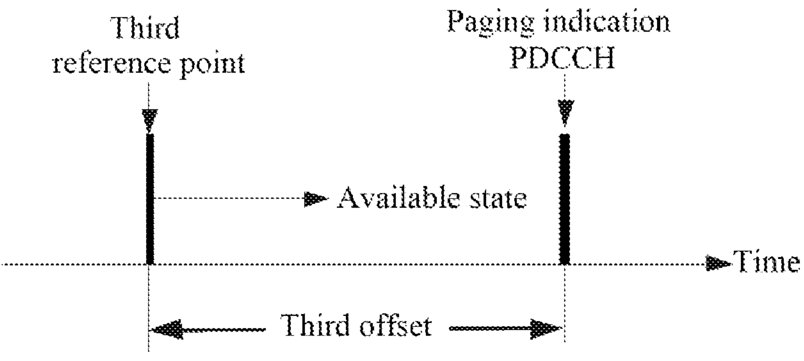
FIG. 7 is a schematic diagram of a third reference point according to an embodiment of the present disclosure.

FIG. 7 is a schematic diagram of a third reference point according to an embodiment of the present disclosure. As shown in FIG. 7, it is determined that a state of at least one reference signal is an available state after the third reference point.

Figure 8:
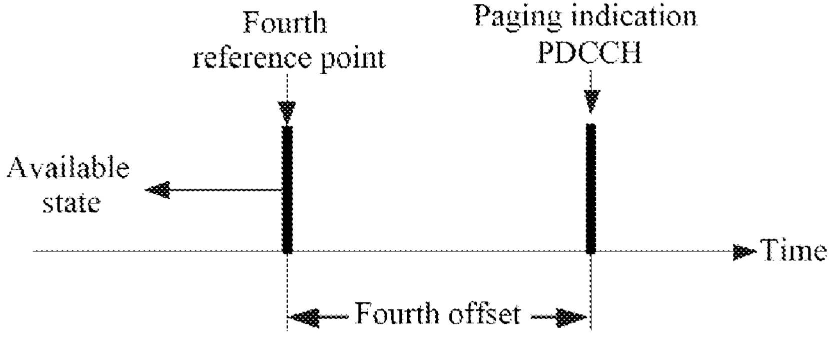
FIG. 8 is a schematic diagram of a fourth reference point according to an embodiment of the present disclosure.

FIG. 8 is a schematic diagram of a fourth reference point according to an embodiment of the present disclosure. As shown in FIG. 8, it is determined that a state of at least one reference signal is an available state before the fourth reference point.

Figure 9:
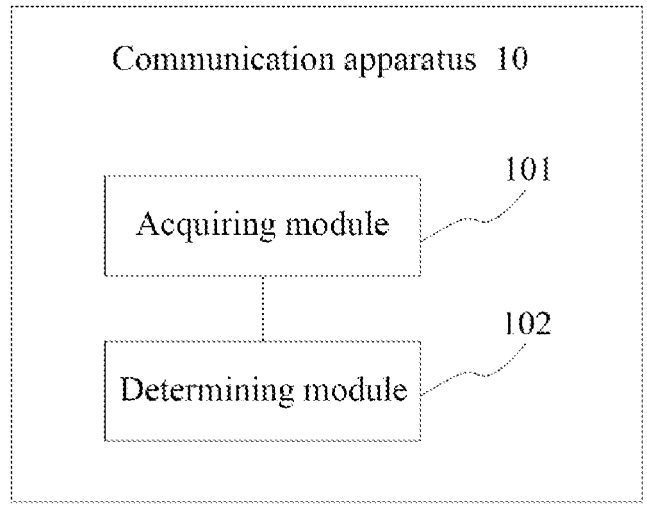
FIG. 9 is a first schematic structural diagram of a communication apparatus according to an embodiment of the present disclosure.

FIG. 9 is a first schematic structural diagram of a communication apparatus according to an embodiment of the present disclosure. As shown in FIG. 9, a communication apparatus 10 includes: an acquiring module 101 and a determining module 102, where

- the acquiring module 101 is configured to monitor a paging indication physical downlink control channel (PDCCH), and acquire indication information; and the determining module 102 is configured to determine, based on the indication information, a state of at least one reference signal, or determine, based on the indication information, whether to monitor a paging PDCCH, where the state is an available state or an unavailable state.

The communication apparatus 10 provided in the embodiment of the present disclosure can be used to implement the technical solutions of the above method embodiments, and the implementation principles and technical effects thereof are similar, which will not be repeated here.

In a possible design, the determining module 102 is specifically configured to: determine a state of at least one reference signal corresponding to a synchronization signal block (SSB) associated with a paging monitoring occasion (PMO).

In a possible design, the indication information is 1 bit, where the 1 bit indicates states of all reference signals corresponding to the synchronization signal block (SSB) associated with the paging monitoring occasion (PMO).

In a possible design, the indication information is more than 1 bit, where each 1 bit indicates a state of one reference signal corresponding to the synchronization signal block (SSB) associated with the paging monitoring occasion (PMO).

In a possible design, the determining module 102 is specifically configured to:

determine that the state of the at least one reference signal is an available state before a paging monitoring occasion (PMO) or before a paging occasion (PO).

In a possible design, the determining module 102 is specifically configured to:

determine that the state of the at least one reference signal is an available state after a first reference point. A distance between the first reference point and a paging monitoring occasion (PMO) or a paging occasion (PO) is a first offset.

In a possible design, the determination module 102 is specifically configured to:

determine that the state of the at least one reference signal is an available state before a second reference point. A distance between the second reference point and a paging monitoring occasion (PMO) or a paging occasion (PO) is a second offset.

In a possible design, the determining module 102 is specifically configured to:

determine that the state of the at least one reference signal is an available state before the paging indication PDCCH.

In a possible design, the determination module 102 is specifically configured to:

determine that the state of the at least one reference signal is an available state after a third reference point, where a distance between the third reference point and the paging indication PDCCH is a third offset.

In a possible design, the determination module 102 is specifically configured to:

determine that the state of the at least one reference signal is an available state after a fourth reference point, where a distance between the fourth reference point and the paging indication PDCCH is a fourth offset.

Figure 10:
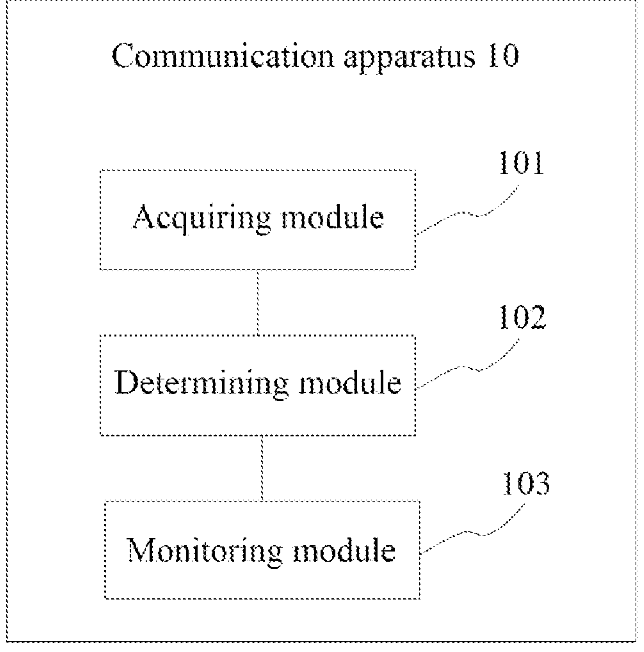
FIG. 10 is a second schematic structural diagram of a communication apparatus according to an embodiment of the present disclosure.

FIG. 10 is a second schematic structural diagram of a communication apparatus according to an embodiment of the present disclosure. On the basis of FIG. 9, as shown in FIG. 10, the communication apparatus 10 also includes: a monitoring module 103, where, the monitoring module 103 is configured to, when the indication information is a first preset value, monitor the paging PDCCH in a PF.

In a possible design, the indication information is carried by 1 bit.

In a possible design, the monitoring module 103 is configured to monitor the paging PDCCH in a PO when the indication information is a first preset value.

In a possible design, the indication information is carried by 1 bit.

In a possible design, the monitoring module 103 is configured to, when the indication information is a first preset value, monitor the paging PDCCH in a PO subgroup or a PO to which the PO subgroup belongs.

In a possible design, the indication information is carried by 1 bit.

In a possible design, the acquiring module 101 is specifically configured to:

determine a start position and/or a length of the indication information in DCI, where the DCI is carried on the paging indication PDCCH: and acquire the indication information from the DCI based on the start position and/or the length.

In a possible design, the acquiring module 101 is specifically configured to:

determine the start position and/or the length of the indication information in the DCI based on a high-layer signaling.

In a possible design, the acquiring module 101 is specifically configured to:

determine, based on a paging frame PF or a paging occasion PO that needs to be monitored, the start position and/or the length of the indication information in the DCI.

In a possible design, the acquiring module 101 is specifically configured to:

determine the start position and/or the length of the indication information in the DCI based on a high-layer signaling and a paging frame PF or a paging occasion PO that needs to be monitored.

In a possible design, the acquiring module 101 is specifically configured to:

determine the start position and/or the length of the indication information in the DCI based on a PO subgroup to which the terminal device belongs.

In a possible design, the acquiring module 101 is further configured to:

acquire the indication information in a medium access control (MAC) signaling, an MAC packet data unit (PDU), or an MAC control element CE.

In a possible design, the monitoring module 103 is further configured to:

monitor the paging indication PDCCH in a monitoring occasion.

In a possible design, the monitoring occasion is before at least one paging frame (PF).

In a possible design, the monitoring occasion is before at least one PF and is closest to a first PF of the at least one PF.

In a possible design, the monitoring occasion is before at least one PF and is closest to a first PF of the at least one PF, and has a full duration.

In a possible design, the monitoring occasion is before at least one paging occasion (PO).

In a possible design, the monitoring occasion is before at least one paging occasion (PO) and is closest to a first PO of the at least one PO.

In a possible design, the monitoring occasion is before at least one paging occasion (PO) and is closest to a first PO of the at least one PO, and has a full duration.

Figure 11:
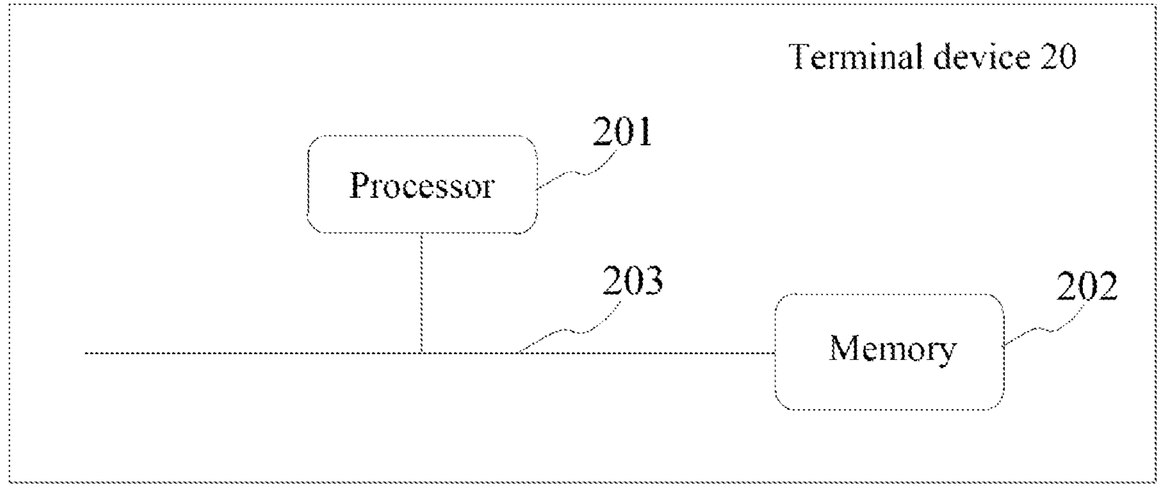
FIG. 11 is a schematic diagram of a hardware structure of a terminal device according to an embodiment of the present disclosure.

FIG. 11 is a schematic diagram of a hardware structure of a terminal device according to an embodiment of the present disclosure. As shown in FIG. 11, a terminal device 20 includes: a processor 201 and a memory 202, where, the processor 201 and the memory 202 are connected through a bus 203.

In a specific implementation process, the processor 201 executes a computer-executed instruction stored in the memory 202, so that the processor 201 performs the communication method in the foregoing method embodiments.

For the specific implementation process of the processor 201, reference may be made to the foregoing method embodiments. The implementation principles and technical effects thereof are similar, and details will not be repeated here in this embodiment.

In the above embodiment shown in FIG. 11, it should be understood that the processor may be a central processing unit (CPU), and may also be other general-purpose processors, digital signal processors (DSP), dedicated integrated circuits (ASIC), etc. A general-purpose processor may be a microprocessor, or the processor may be any conventional processor, or the like. The steps of the method disclosed in conjunction with the application can be directly embodied as being executed by a hardware processor, or executed by a combination of hardware and software modules in the processor.

The memory may include a high-speed RAM memory, and may also include a non-volatile memory NVM, such as a disk memory.

The bus may be an industry standard architecture (ISA) bus, a peripheral component (PCI) bus, or an extended industry standard architecture (EISA) bus, or the like. The bus can be divided into an address bus, a data bus, a control bus and so on. For ease of representation, the bus in the drawing of the present disclosure is not limited to only one bus or one type of bus.

The present disclosure provides a computer-readable storage medium which has a computer-executable instruction stored thereon, and when a processor executes the computer-executable instruction, the communication method according to the above method embodiments is implemented.

The present disclosure also provides a computer program product, including a computer program, and when the computer program is executed by a processor, the communication method in the foregoing method embodiments is implemented.

The above computer-readable storage medium, the above readable storage medium may be realized by any type of volatile or non-volatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The readable storage medium may be any available medium that can be accessed by a general purpose or special purpose computer.

An illustrative readable storage medium is coupled to the processor such that the processor can read information from, and write information to, the readable storage medium. Of course, the readable storage medium can also be a component of the processor. The processor and the readable storage medium may be located in application specific integrated circuits (ASIC). Of course, the processor and the readable storage medium may also exist in the device as discrete components.

The division of the units is only a logical functional division, and they can be divided in other ways in the actual implementation. For example, multiple units or components can be combined or can be integrated into another communication system, or some features can be ignored, or not be implemented. On the other hand, the mutual coupling, direct coupling or communication connection shown or discussed can be indirect coupling or communication connection through some interfaces, devices or units, which can be electrical, mechanical or in other forms.

The units illustrated as separate components may or may not be physically separated, and the components shown as units may or may not be physical units, that is, they may be located in the same place or may be distributed to a plurality of network units. Some or all of these units may be selected according to practical needs to achieve the purpose of the solution of the present embodiment.

In addition, each functional unit in each embodiment of the present disclosure may be integrated in a single processing unit, or each unit may be physically present separately, or two or more units may be integrated in a single unit.

The functions, if implemented in the form of software functional units and sold or used as stand-alone products, may be stored in a computer-readable storage medium. Based on this understanding, the technical solution of the present disclosure is essentially, or the part which makes contribution to the prior art, or part of the technical solution can be embodied in the form of a software product. The computer software product may be stored in a storage medium, including several instructions for enabling a computer device (which may be a personal computer, a server, or a network device, etc.) to execute all or part of the steps of the methods in the various embodiments of the present disclosure. The aforementioned storage media includes: a U disk, a mobile hard disk, a read-only memory (ROM), a random access memory (RAM), a magnetic disk or an optical disk and other medium that can store program codes.

Those of ordinary skill in the art can understand that all or part for implementing the above method embodiments can be completed by program instructions and related hardware. The aforementioned program can be stored in a computer-readable storage medium. When the program is executed, it executes the steps included in the above method embodiments; and the aforementioned storage medium includes: ROM, RAM, magnetic disk or optical disk and various media that can store program codes.

Finally, it should be noted that the above embodiments are only used to illustrate the technical solutions of the application, but not to limit it; although the present disclosure has been described in detail with reference to the foregoing embodiments, those skilled in the art should understand that, they can make modifications to the technical solutions described in the foregoing embodiments, or equivalently replace some or all of the technical features, and these modifications or replacements do not cause the essence of the corresponding technical solutions to deviate from the scope of technical solutions of the embodiments of the present disclosure.

The invention claimed is:

1. A communication method, applied to a terminal device and comprising:

monitoring a paging indication physical downlink control channel (PDCCH) in a monitoring occasion, and acquiring first indication information and second indication information, wherein the monitoring occasion is before at least one paging frame PF; and determining, based on the first indication information, a state of at least one reference signal, and determining, based on the second indication information, whether to monitor a paging PDCCH, wherein the state is an available state or an unavailable state;

wherein the acquiring the first indication information comprises:

determining, based on a high-layer signaling and a paging frame (PF) or a paging occasion (PO) that needs to be monitored, a start position and a length of the first indication information in downlink control information (DCI), wherein the acquiring the second indication information comprises:

determining, based on the high-layer signaling, a start position and a length of the second indication information in the downlink control information (DCI), wherein the DCI is carried on the paging indication PDCCH.

2. The method according to claim 1, wherein the determining the state of the at least one reference signal comprises:

determining a state of at least one reference signal corresponding to a synchronization signal block (SSB) associated with a paging monitoring occasion (PMO).

3. The method according to claim 2, wherein the first indication information is 1 bit, wherein the 1 bit indicates states of all reference signals corresponding to the synchronization signal block (SSB) associated with the paging monitoring occasion (PMO).

4. The method according to claim 2, wherein the first indication information is more than 1 bit, wherein each 1 bit indicates a state of one reference signal corresponding to the synchronization signal block (SSB) associated with the paging monitoring occasion (PMO).

5. The method according to claim 1, wherein the determining the state of the at least one reference signal comprises:

determining that the state of the at least one reference signal is an available state before a paging monitoring occasion (PMO) or before a paging occasion (PO).

6. The method according to claim 1, wherein the determining the state of the at least one reference signal comprises:

determining that the state of the at least one reference signal is an available state after a first reference point, wherein a distance between the first reference point and a paging monitoring occasion (PMO) or a paging occasion (PO) is a first offset; or determining that the state of the at least one reference signal is an available state before a second reference point, wherein a distance between the second reference point and a paging monitoring occasion (PMO) or a paging occasion (PO) is a second offset.

7. The method according to claim 1, wherein before the paging indication PDCCH, the state of the at least one reference signal is determined to be an available state.

8. The method according to claim 1, wherein the state of the at least one reference signal is determined to be an available state after a third reference point, wherein a distance between the third reference point and the paging indication PDCCH is a third offset; or the state of the at least one reference signal is determined to be an available state after a fourth reference point, wherein a distance between the fourth reference point and the paging indication PDCCH is a fourth offset.

9. The method according to claim 1, wherein in a case that the second indication information is a first preset value, the paging PDCCH is monitored in a paging frame (PF).

10. The method according to claim 9, wherein the second indication information is carried by 1 bit.

11. The method according to claim 1, wherein in a case that the second indication information is a first preset value, the paging PDCCH is monitored in a PO.

12. The method according to claim 1, wherein in a case that the second indication information is a first preset value, the paging PDCCH is monitored in a PO subgroup or a PO to which the PO subgroup belongs.

13. The method according to claim 1, wherein the determining at least one of the start position or the length of the first indication information in the DCI further comprises:

determining, based on a PO subgroup to which the terminal device belongs, at least one of the start position or the length of the first indication information in the DCI.

14. A communication apparatus, applied to a terminal device and comprising:

a memory, a transceiver and a processor:

wherein the memory is configured to store a computer program;

the transceiver is configured to send and receive data under control of the processor;

the processor, by executing the computer program, is configured to:

monitor a paging indication physical downlink control channel (PDCCH) in a monitoring occasion, and acquire first indication information and second indication information, wherein the monitoring occasion is before at least one paging frame PF; and determine, based on the first indication information, a state of at least one reference signal, and determine, based on the second indication information, whether to monitor a paging PDCCH, wherein the state is an available state or an unavailable state;

wherein the acquiring the first indication information comprises:

determining, based on a high-layer signaling and a paging frame (PF) or a paging occasion (PO) that needs to be monitored, a start position and a length of the first indication information in downlink control information (DCI), wherein the acquiring the second indication information comprises:

determining, based on the high-layer signaling, a start position and a length of the second indication information in the downlink control information (DCI), wherein the DCI is carried on the paging indication PDCCH.

15. A non-transitory computer-readable storage medium, wherein the computer-readable storage medium has a computer-executable instruction stored thereon, and when a processor executes the computer-executable instruction, the processor execute steps of:

monitoring a paging indication physical downlink control channel (PDCCH) in a monitoring occasion, and acquiring first indication information and second indication information, wherein the monitoring occasion is before at least one paging frame PF; and determining, based on the first indication information, a state of at least one reference signal, and determining, based on the second indication information, whether to monitor a paging PDCCH, wherein the state is an available state or an unavailable state;

wherein the acquiring the first indication information comprises:

determining, based on a high-layer signaling and a paging frame (PF) or a paging occasion (PO) that needs to be monitored, a start position and a length of the first indication information in downlink control information (DCI), wherein the acquiring the second indication information comprises:

determining, based on the high-layer signaling, a start position and a length of the second indication information in the downlink control information (DCI), wherein the DCI is carried on the paging indication PDCCH.

* * * * *